H. G. HOWELL.
OVEN.
APPLICATION FILED MAR. 25, 1911.

1,019,897. Patented Mar. 12, 1912.

Witnesses
Hugh H. Ott
H. Wright

Inventor
Henry G. Howell
By Victor J. Evans
Attorney

UNITED STATES PATENT OFFICE.

HENRY G. HOWELL, OF ANDERSON, SOUTH CAROLINA.

OVEN.

1,019,897.  Specification of Letters Patent.  Patented Mar. 12, 1912.

Application filed March 25, 1911. Serial No. 616,823.

*To all whom it may concern:*

Be it known that I, HENRY G. HOWELL, a citizen of the United States, residing at Anderson, in the county of Anderson and State of South Carolina, have invented new and useful Improvements in Ovens, of which the following is a specification.

This invention relates to ovens, and has particular application to a novel and improved type of oven which may be temporarily attached to and removed from any suitable heating agent, such, for instance, as an open grate, or the like.

In carrying out my invention, it is my purpose to provide an oven, which will be simple and compact, and convenient in its structural features, and one which may be readily and quickly connected to or removed from a heating grate or the like.

Still a further object of my invention is to provide an oven having the walls thereof formed with an air space whereby the air contained within said space may be heated when the oven is in use, thereby attaining an even temperature over the entire surface of the oven.

I also aim to provide an oven having a novel form of top slide which may slide directly over the top of the oven when not in use, but which may be extended to form a flat plate like surface for frying.

With the above recited objects and others of a similar nature in view, my invention consists in the construction, combination and arrangement of parts set forth in and falling within the scope of the appended claims.

Figure 1:
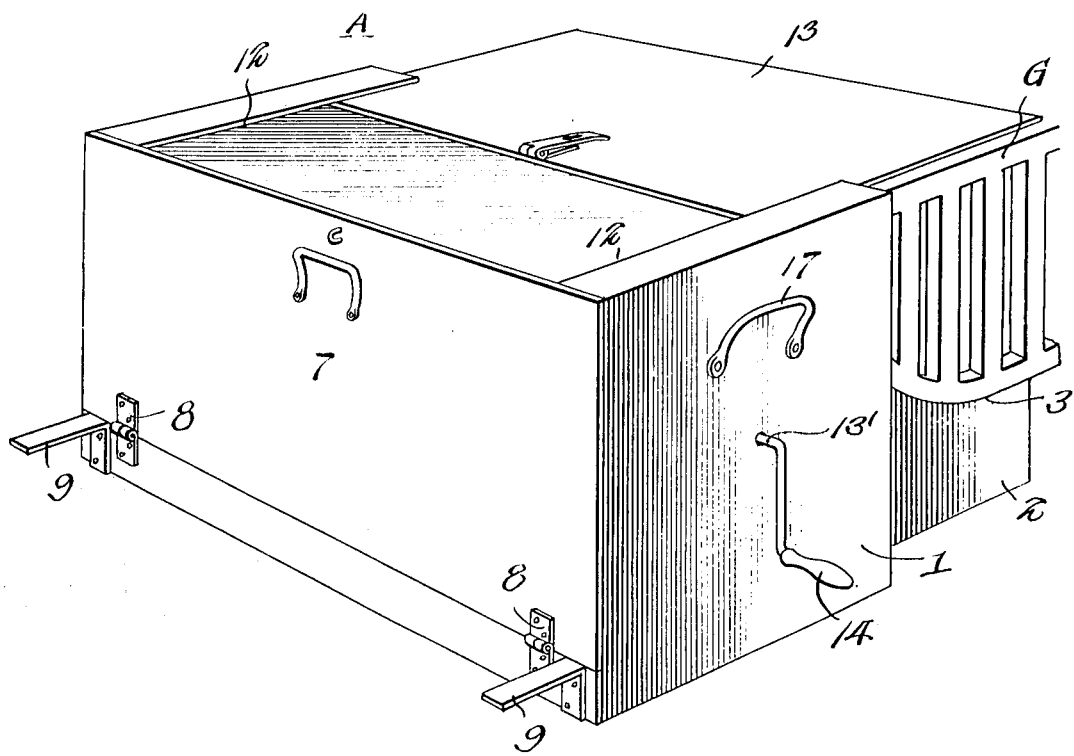
Figure 2:
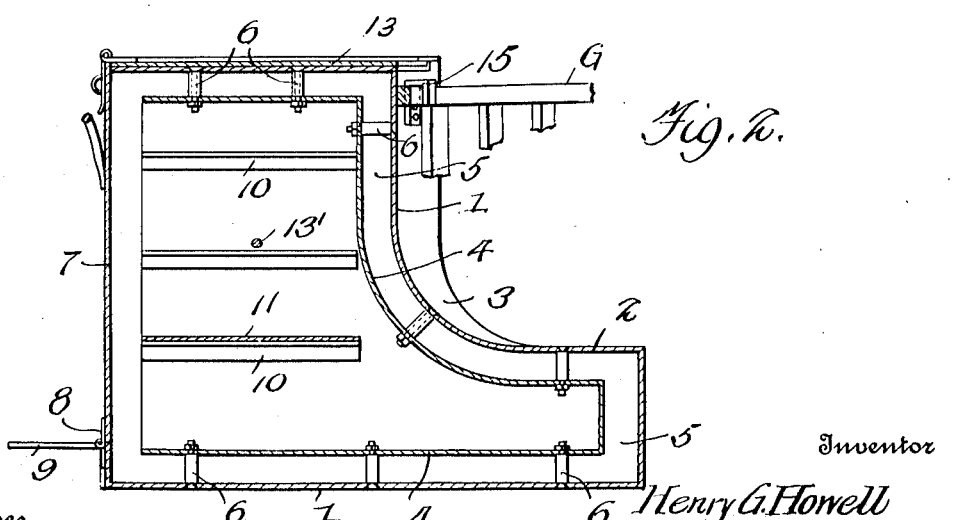

In the accompanying drawings:—Figure 1 is a perspective view of an oven embodying my invention, said view also showing a portion of the grate to which the oven is attached, the top lid or slide being slightly extended over the grate surface. Fig. 2 is a vertical sectional view taken through the oven.

In the accompanying drawings, the letter A designates the body of the oven as an entirety, said body portion comprising an outer casing 1, having a rear portion 2 curved as at 3 to conform to the contour of the sides and bottom of the grate G, a portion of which is shown in Fig. 1. Located within the outer casing and spaced apart therefrom, and of similar contour, is a second or inner chamber 4, the construction and arrangement being such that a space 5 is formed, the air in which will be heated when the oven is in use. In order to retain the two parts rigidly in their spaced relation, I may provide any suitable means such as the spacing studs or bars 6, any suitable number of which may be employed and which may be arranged as will be found convenient or desirable. The front door of the oven is illustrated as at 7 and is hinged to the base of the outer casing as at 8, suitable brackets or stops 9 projecting outward from the base so that when the door is open it will lie upon and be supported by such brackets.

Within the inner chamber of the oven I arrange a suitable number of supporting strips 10 spaced apart any desired distance, and adapted to receive and support the removable shelves 11. The top of the oven body has formed at the sides thereof the grooves 12 within which moves the top lid or slide 13, the latter being designed to be extended over the fire when it is desired to employ the lid as a frying plate or pan. When not in use, the lid may be moved to a position over the top of the oven. Extending through the oven body, preferably centrally thereof, is a rod 13' having one of its ends outside of the oven body provided with a handle 14, said rod being designed to support meat or other food which it may be desired to roast. When not in use, the rod may be withdrawn.

In order to support the oven upon the grate or other surface, any securing means may be employed such for instance as a suitable number of hooks such as are shown at 15, each of said hooks being connected at the back of the oven, as illustrated in Fig. 2, to engage with the top bar of the vertical wall of the grate. Furthermore, in order to readily apply and remove the oven, and then to convey the same from place-to-place, I have provided handles at the sides thereof, such as is shown at 17.

From the above description, taken in connection with the accompanying drawings, the construction of and manner of employing my invention will be readily apparent. When it is desired to use the oven in connection with an open grate, such as is shown in Fig. 1, the curved back portion of the oven is placed in juxtaposition to the grate body, and the hooks are engaged with the top bar of the grate. As the oven is heated, the air within the space between the walls of the outer casing and inner chamber will become heated, and an even temperature will be attained. Furthermore, the oven being placed close to the grate will be rapidly heated so that the food may be quickly and thoroughly cooked.

It will be seen that I have provided an exceedingly simple, convenient and economical form of oven which may be applied to and removed from any form of grate or other heating device, and in this connection, although I have in the present instance, shown one form or shape of oven adapted to a particular style of open grate, I wish it to be understood that I do not limit my invention to the precise details and to the specific form above set forth, as modification and variation may be made without departing from the spirit of the invention or exceeding the scope of the appended claims.

I claim:—

1. The combination with a grate having a curved front, and a top bar, of an oven comprising an outer casing a chamber located therein and spaced apart therefrom, whereby an air space is formed between the walls of the chamber and casing, a slidable lid at the top of the oven adapted to be extended over the grate, and means for removably fastening the oven to the top bar of the grate, the rear of said oven being shaped to conform to the curved wall of the grate.

2. The combination with a grate, of an oven comprising an outer casing having the rear wall thereof shaped to conform to the contour of the grate, an inner chamber conforming in shape to the outer chamber but spaced apart therefrom, whereby a hot air space is formed between the walls of the casing and chamber, a roasting rod extending through the oven, a slidable lid mounted on top of the oven and adapted to be extended over the grate, a door for the oven, and means for removably securing the oven to the grate.

In testimony whereof I affix my signature in presence of two witnesses.

HENRY G. HOWELL.

Witnesses:
W. H. FRIERSON,
F. H. BOLEMAN.